Patented Jan. 18, 1949

2,459,764

UNITED STATES PATENT OFFICE 2,459,764

PURIFICATION OF NATIVE SULFUR

Frank M. Yeiser, Buffalo, N. Y., assignor, by mesne assignments, to Niagara Research Corporation, Buffalo, N. Y.

No Drawing. Application June 14, 1945,
Serial No. 599,519

2 Claims. (Cl. 23—224)

Industrial storage and handling methods as applied to native sulphur derived from underground deposits or the like invariably subject the sulphur to various soil contaminations requiring the sulphur to be subsequently cleaned prior to use thereof as for example in the manufacture of sulphuric acid by the so-called "contact" process. The contaminations referred to will often include appreciable quantities of dirt and cinders and rust and organic matter and other debris resulting from exposure when openly piled in stock yards and/or transferred in railroad cars and the like. Raw native sulphur, however, is free from such contaminants as arsenic and antimony which are present in sulphur derived by metallurgical or chemical treatment of sulphide minerals. Incidental to storage and transportation the native sulphur also becomes exposed to oxidation and moisture absorption sufficient to produce therein varying amounts of free sulphuric acid. Thus, upon subsequent melting of the sulphur, as for example in preparation for feeding the latter into the burner and converter units of a contact process sulphuric acid manufacturing plant, the residual acidity and moisture content referred to hereinabove is at least partially retained within the molten sulphur because of the relatively low temperature at which the sulphur melts.

The acid and moisture contaminations hereinabove referred to are usually present to such degree that it is unfeasible to use a metallic screening device in connection with a filtering process designed to screen out the soil contaminations first referred to; and although various non-metallic type screening or filtering devices have been previously developed for filtering solid impurities out of liquids, such non-metallic filtering devices are invariably unsuited to the problem hereinabove set forth because of their ineffectiveness and/or tendencies to become plugged and/or inoperative for various reasons. Furthermore, prior attempts to employ metallic screening or filtering devices to remove soil contaminations from molten sulphur in the presence of acid and/or moisture contaminations as explained hereinabove have proven impracticable because of the relatively rapid attack of the acid upon the metal structure of the filtering device resulting in rapid corrosive deterioration of the filter structure. Therefore, sulphuric acid plants have heretofore usually employed dirt settling pits into which the molten sulphur is delivered and later withdrawn for feeding into the sulphur burners, with a view to permitting the heavier dirt impurities to settle out of the portion of the sulphur to be used. Such attempts of the prior art have been quite inadequate however and have proven to be otherwise undesirable because of the expense of periodically cleaning such pits and the wasting of valuable sulphur incidental thereto.

The primary object of the present invention is to provide an improved method for cleansing raw native sulphur while in molten state and while containing soil and acid and moisture contaminations such as hereinabove referred to, for the purpose of eliminating such contaminations from the molten sulphur prior to delivery to the point of its intended use. Another object of the invention is to provide an improved method for treating molten sulphur as set forth hereinabove, said method embodying a novel combination chemical and physical treating process of such nature as to make it practicable to employ metallic filtering devices in conjunction with the cleansing treatment. Another object of the invention is to provide an improved method for treating sulphur as set forth hereinabove, which method avoids residual additions to the cleansed sulphur of undesirable by-products of the treating method. Other objects and advantages of the invention will appear in the more detailed specification hereinafter.

It has also been determined that introduction of soluble salts of materials foreign to sulphur into the molten sulphur passing into the burning chamber and converters of an acid producer results in plugging of the burner nozzles and contamination and fusion and efficiency deterioration of the catalysts therein. Therefore, the invention contemplates a novel combination chemical and physical treatment of native sulphur while in the molten state; the chemical phase of the treatment being first conducted to provide simultaneously complete neutralization of any free acid complex in the molten sulphur; vaporization of any residual moisture that may be initially held within the acid; and the formation of by-products of the chemical phase of the treatment to form only salts that are insoluble in the product to be treated by the physical phase of the process. The second or physical phase of the treatment contemplates employment of a filtering medium for screening the initial soil and insoluble salt by-products of the chemical treatment or other solids from the chemically treated sulphur; said filtering medium comprising preferably a metallic screen device supporting a filtering cake of chemically inert and fibrous material. Thus, the extremely fine and highly efficient filtering performance of a filter cake device is obtained in conjunction with optimum physical support thereof by a metallic screen device under conditions eliminating danger of corrosion deterioration of the screen device.

More specifically, the invention contemplates for the initial step addition to the raw molten sulphur of an acid neutralizing and dehydrating material such as is adapted to react with acid and/or moisture contaminations in the molten sulphur to produce only insoluble salt by-products; the additive material being supplied in quantity slightly in excess of that required to perfect neutralization and dehydration of the sulphur. The added material may be supplied either periodically or continuously to the molten sulphur as it moves through a vat or pit in such manner as provide sufficient agitation of the sulphur to obtain thorough treatment thereof; the mixing pit being located between the sulphur melter and the pump delivering the sulphur to the burner unit of the sulphuric acid plant. Also, it has been determined that the precoat cake of filter-aid material on the sulphur filtering device hereinabove referred to may preferably contain a substantial proportion of the neutralizing and dehydrating material so as to provide initial protection for the metallic screen structure against any free acid that may be entrained in the sulphur supply at the commencement of each filtering operation. In my patent application Serial No. 42,123 filed August 2, 1948, I describe in greater detail and claim a specific construction of a precoated filter of the type referred to above.

It will of course be understood that the filter devices hereinabove referred to may be provided in dual or "companion" arrangements to permit the filtering operation to be conducted alternately by each of the companion filters. Thus, whenever the debris accumulation against one of the filters builds up so as to appreciably slow down the filtering rate the flow system may be diverted to the companion filter, and the first filter may then be cleaned at leisure and recoated with filter-aid in preparation for repetition of the operating cycle. Complete chemical cleansing is thereby assured and any excess of the treatment material along with the the insoluble salt by-products so formed simply accumulate upon the filter cake so as to supplement the filtering body thereof while at the same time building therein a further barrier against passage of free acid into corrosive contacts with the metallic structure of the filter screen.

It has been determined, for example, that material such as barium oxide; barium hydroxide; barium carbonate; calcium oxide; calcium hydroxide; calcium carbonate; and the like may be successfully employed for the purposes hereinabove set forth. Such materials may be beneficially employed in quantities of say approximately 10% in excess of the quantities thereof calculated to neutralize and dehydrate the raw molten sulphur to be treated. Materials such as the above are adapted to neutralize any free acid in the molten sulphur and to free any excess moisture therein while producing only insoluble salt by-products such as will be retained upon the filter cake of the filtering unit to which the treated sulphur is subsequently fed.

Naturally, selection of the material to be added to the molten sulphur for the treatment hereinabove prescribed will be determined by economic considerations, and in this respect the calcium compounds referred to hereinabove will sometimes be preferred because they are readily available commercially and are relatively inexpensive. However care must be exercised in selecting, for example, a suitable lime or other calcium compound for the purposes set forth hereinabove because commercially available calcium compounds such as pulverized limestone; unslaked lime; and hydrated lime often include substantial proportions of magnesium, having been manfactured from dolomitic limestone. Inasmuch as magnesium compounds react with acids to form soluble salts, it is inadvisable to employ substances for addition to the molten sulphur which contain appreciable quantities of magnesium or other soluble salt forming materials such as potassium and sodium and the like. The soluble salts which would be produced incidental to the use of the last named compounds would pass directly through the subsequent filtering stage of the treatment to be delivered with the molten sulphur into the burning chamber and converters of the sulphuric acid plant, whereupon the salts referred to would be converted into dry salts of sodium or potassium or the like and would tend to foul the burners and/or the catalysts of the converters.

In accord with the method of the present invention the molten sulphur which has been chemically treated as explained hereinabove is next passed through a filtering device comprising a metallic screen which in some instances will preferably carry a filtering cake composed of some suitable fibrous material. The filter screen structure may be of any desired physical form and arrangement, and the filtering cake material may be of any suitable type of which several suitable forms are presently available on the market. For example, the cake material may comprise diatomaceous earth or any other chemically inert and pulverant material having suitable filtering characteristics. The molten sulphur will be thereby cleared of all solid impurities such as dirt or other soilage initially present or picked up therein during the storage and transportation of the sulphur prior to delivery for its intended use, and the molten sulphur passing through the metallic screening device will be free from corrosion producing acid while the insoluble salt by-products of the chemical treatment hereinabove referred to will become lodged upon the filter cake in such manner as to supplement the latter as a filtering medium. Consequently, the efficient filtering characteristics of the filtering device will be unaffected as the process continues except as such filtering device may need maintenance attention under normal non-acid conditions.

It has been determined that the method of the invention eliminates the previous disadvantages and difficulties referred to hereinabove with respect to prior art uses of metallic filtering equipment in connection with industrial processing of molten sulphur, and that the method of the invention renders employment of metallic screening or filtering devices to be highly practicable in such instances and greatly reduces maintenance costs in such processes and time losses otherwise expended for repair and/or renewal of corroded equipment.

It will be appreciated that the method of the invention is also applicable to a wide variety of purposes wherever the problem involves the filtering of molten sulphur through use of industrially practical filtering devices; and that although only one specific form and application of the invention have been described in detail herein, the invention is not so limited but that various changes may be made therein without departing from the spirit of the invention or the scope of the appended claims.

What is claimed is:

1. A method of purifying raw native sulphur containing contaminations including dirt particles, sulphuric acid and moisture but free of such contaminations as arsenic and antimony which consists in mixing with said sulphur an acid-neutralizing material chosen from the group consisting of oxygenous compounds of calcium and barium, the chosen material being added in a state in which it is capable of combining with sulphuric acid and moisture contaminations in the sulphur with the production of products which are insoluble in molten sulphur, the quantity of material which is added being in substantial excess over the quantity required for combination with said acid and moisture contaminants and thereupon conducting the sulphur in a molten state through a filter consisting in part at least of an acid-reactant metal whereby the sulphur contaminations and the added neutralizing material in combined and uncombined state are removed from the molten sulphur conducting said contaminated sulphur.

2. A method of purifying raw native sulphur containing contaminations including dirt particles, sulphuric acid, and moisture but free of such contaminations as arsenic and antimony which consists in mixing with said sulphur an acid-neutralizing material chosen from the group consisting of oxygenous compounds of calcium and barium, the chosen material being added in a state in which it is capable of combining with sulphuric acid and moisture contaminations in the sulphur with the production of products which are insoluble in molten sulphur, the quantity which is added being in substantial excess over the quantity required for combination with acid and moisture contaminants and thereupon conducting the contaminated sulphur while molten through a filter consisting of a metallic screen coated with pulverant filter-aid material, the latter including an acid-neutralizing material of the class hereinabove indicated, whereby the sulphur contaminations and the added neutralizing material in combined and uncombined state are removed from the molten sulphur.

FRANK M. YEISER.

REFERENCES CITED

The following references are of record in the file of this patent:

UNITED STATES PATENTS

| Number | Name | Date |
|---|---|---|
| 1,970,147 | Levy | Aug. 14, 1934 |

FOREIGN PATENTS

| Number | Country | Date |
|---|---|---|
| 88,553 | France | Mar. 1, 1921 |